United States Patent
Pall

(10) Patent No.: US 9,497,191 B2
(45) Date of Patent: Nov. 15, 2016

(54) MULTIPLE USER AUTHENTICATIONS ON A COMMUNICATIONS DEVICE

(71) Applicant: Microsoft Technology Licensing, LLC

(72) Inventor: Gurdeep S. Pall, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/535,560

(22) Filed: Nov. 7, 2014

(65) Prior Publication Data

US 2015/0067801 A1  Mar. 5, 2015

Related U.S. Application Data

(63) Continuation of application No. 11/764,138, filed on Jun. 15, 2007, now Pat. No. 8,914,847.

(51) Int. Cl.
| | |
|---|---|
| *H04L 29/00* | (2006.01) |
| *H04L 29/06* | (2006.01) |
| *G06F 21/32* | (2013.01) |
| *H04L 9/32* | (2006.01) |

(52) U.S. Cl.
CPC ........... *H04L 63/0861* (2013.01); *G06F 21/32* (2013.01); *H04L 9/32* (2013.01); *H04L 9/3231* (2013.01); *H04L 63/0428* (2013.01); *H04L 63/083* (2013.01)

(58) Field of Classification Search
CPC .................................. H04L 9/00; G06F 17/30
USPC ......................................................... 713/186
See application file for complete search history.

(56) References Cited

U.S. PATENT DOCUMENTS

| | | |
|---|---|---|
| 6,219,439 B1 | 4/2001 | Burger |
| 6,466,781 B1 | 10/2002 | Bromba et al. |
| 6,715,674 B2 | 4/2004 | Schneider et al. |

(Continued)

FOREIGN PATENT DOCUMENTS

| | | |
|---|---|---|
| CN | 1668003 A | 9/2005 |
| WO | 0127723 A1 | 4/2001 |

OTHER PUBLICATIONS

International Search Report for Application No. PCT/US2008/066216; Applicant: Microsoft Corporation, Date of Mailing: Nov. 28, 2005 (3 pages).

(Continued)

*Primary Examiner* — Michael D Anderson
(74) *Attorney, Agent, or Firm* — Monica Adjemian; Tom Wong; Micky Minhas

(57) ABSTRACT

A communications device provides a biometric reader to authenticate users onto the communications device based on a single biometric input. The communications device maintains a local copy of the strong authentication credentials, such as a user identification and password, and the biometrics which were previously input by users of the communications device. Then, rather than requiring re-entry of the strong authentication credentials to authenticate (or re-authenticate) these users onto the communications device, the communications device is able to authenticate the users based on the input of the appropriate biometric. When a biometric input is received, the communications device identifies the locally stored strong authentication credentials that is associated with the input biometric, and uses the locally stored strong authentication credentials to authenticate the user.

22 Claims, 5 Drawing Sheets

(56) References Cited

U.S. PATENT DOCUMENTS

| | | |
|---|---|---|
| 6,980,669 B1 | 12/2005 | Uchida et al. |
| 7,023,320 B2 | 4/2006 | Dvorak |
| 7,039,812 B2 | 5/2006 | Kawan et al. |
| 7,356,705 B2* | 4/2008 | Ting .................... 713/186 |
| 7,548,981 B1 | 6/2009 | Taylor et al. |
| 7,664,961 B2 | 2/2010 | Blattner et al. |
| 8,433,103 B2* | 4/2013 | Friedman .......... G06K 9/00255 |
| | | 382/116 |
| 8,914,847 B2 | 12/2014 | Pall |
| 2002/0060243 A1 | 5/2002 | Janiak et al. |
| 2002/0174345 A1 | 11/2002 | Patel |
| 2002/0174347 A1 | 11/2002 | Ting |
| 2003/0048904 A1 | 3/2003 | Wang et al. |
| 2003/0163710 A1 | 8/2003 | Ortiz et al. |
| 2004/0225892 A1 | 11/2004 | Bear et al. |
| 2006/0036442 A1 | 2/2006 | Novack et al. |
| 2006/0123240 A1 | 6/2006 | Chaiken |
| 2007/0005988 A1 | 1/2007 | Zhang et al. |
| 2007/0028091 A1 | 2/2007 | Novack et al. |
| 2007/0250920 A1 | 10/2007 | Lindsay |

OTHER PUBLICATIONS

Jain, Anil et al., "Biometric Identification," Communications of the ACM, Feb. 2000, vol. 43, No. 2, pp. 90-98, © 2000 ACM.

Matyas, Jr., Vaclav Vashek and Zdenek Riha, "Toward Reliable User Authentication through Biometrics," Biometrics, IEEE Security & Privacy, May/Jun. 2003, Published by the IEEE Computer Society, © 2003 IEEE, pp. 45-49.

Ratha, N.K. et al., "Enhancing security and privacy in biometrics-based authentication systems," IBM Systems Journal, vol. 40, No. 3, 2001, pp. 614-634, © 2001 IBM.

* cited by examiner

MULTIPLE USER AUTHENTICATIONS ON A COMMUNICATIONS DEVICE

CROSS REFERENCE TO RELATED APPLICATION

This application is a continuation application of U.S. patent application Ser. No. 111/764,138, filed on Jun. 15, 2007, entitled "MULTIPLE USER AUTHENTICATION ON A COMMUNICATION," which is incorporated herein in its entirety by reference.

BACKGROUND

The practice of "office hoteling" is becoming increasingly common. Office hoteling refers to the technique of managing office space by providing office space to workers on an as-needed basis rather than on the traditional, constantly reserved basis. This reduces the amount of physical space that a company needs to maintain while ensuring that every worker can have access to office space when necessary. Office hoteling may be extremely useful to companies that have large numbers of workers who no not require permanently assigned office space, such as consultants or salespeople. For example, when a salesperson requires an office for a couple of days at a specific company facility, the salesperson can just reserve an office for the required days.

To allow workers who work out of these temporarily assigned offices to retain their communication identities, these companies are increasing deploying Internet-based communications solutions. Internet-based communications solutions are focused on the concept of "people-centric" communications. People-centric communications revolve around the concept of contacting a person (e.g., Joe Smith) instead of the person's communication device (e.g., the telephone number of the telephone in Joe Smith's office).

To provide Internet-based communications capabilities, these companies typically outfit the temporarily assigned offices with an Internet communications device, such as an IP telephone. An IP telephone utilizes a mode of communication for conducting real-time communications known as Voice over Internet Protocol ("VoIP"). An IP telephone allows its user to communicate audibly in real-time in a manner similar to a telephone conversation, except that packets of audio are sent over the Internet rather than via the Public Switched Telephone Network ("PSTN"). The IP telephones typically work in conjunction with an Internet communications service provider, such as MICROSOFT Live Communications Server. The Internet communications service provider requires users to first log on to the service before using the provided communications services. For example, upon arriving at an assigned office, a worker can use the provided IP telephone to log on to the connected Internet communications service provider. The log on is typically performed by authenticating the worker using strong user credentials, such as a user identifier and a password. When the worker is finished using the office, for example, at the end of the day, when the worker leaves to attend an offsite meeting, etc., the worker uses the IP telephone to log off the Internet communications service provider, thus inhibiting unauthorized use of the IP telephone. This also allows other workers to use the IP telephone by logging on to the Internet communications service provider. When the worker again wants to use the IP telephone, for example, on the next day, the worker again uses the provided IP telephone to log on to the connected Internet communications service provider. If the worker is assigned the same office for an extended number of days, or multiple number of days within a relatively short period of time, it may be inconvenient and a chore to have to repeatedly input the user identification and password on the same IP telephone in order to log on to the Internet communications service provider.

SUMMARY

A method and system for providing multiple user authentications on a communications device is provided. A communications device provides a biometric reader to authenticate users onto the communications device based on a single biometric input. The communications device maintains a local copy of the strong authentication credentials, such as a user identification and password, and the biometrics which were previously input by users of the communications device. Then, rather than requiring re-entry of the strong authentication credentials to authenticate (or re-authenticate) these users onto the communications device, the communications device is able to authenticate the users based on the input of the appropriate biometric. When a biometric input is received, the communications device identifies the locally stored strong authentication credentials that is associated with the input biometric, and uses the locally stored strong authentication credentials to authenticate the user. In this manner, the communications device allows easy authentication (re-authentication) of multiple users who have already entered their strong user credentials.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
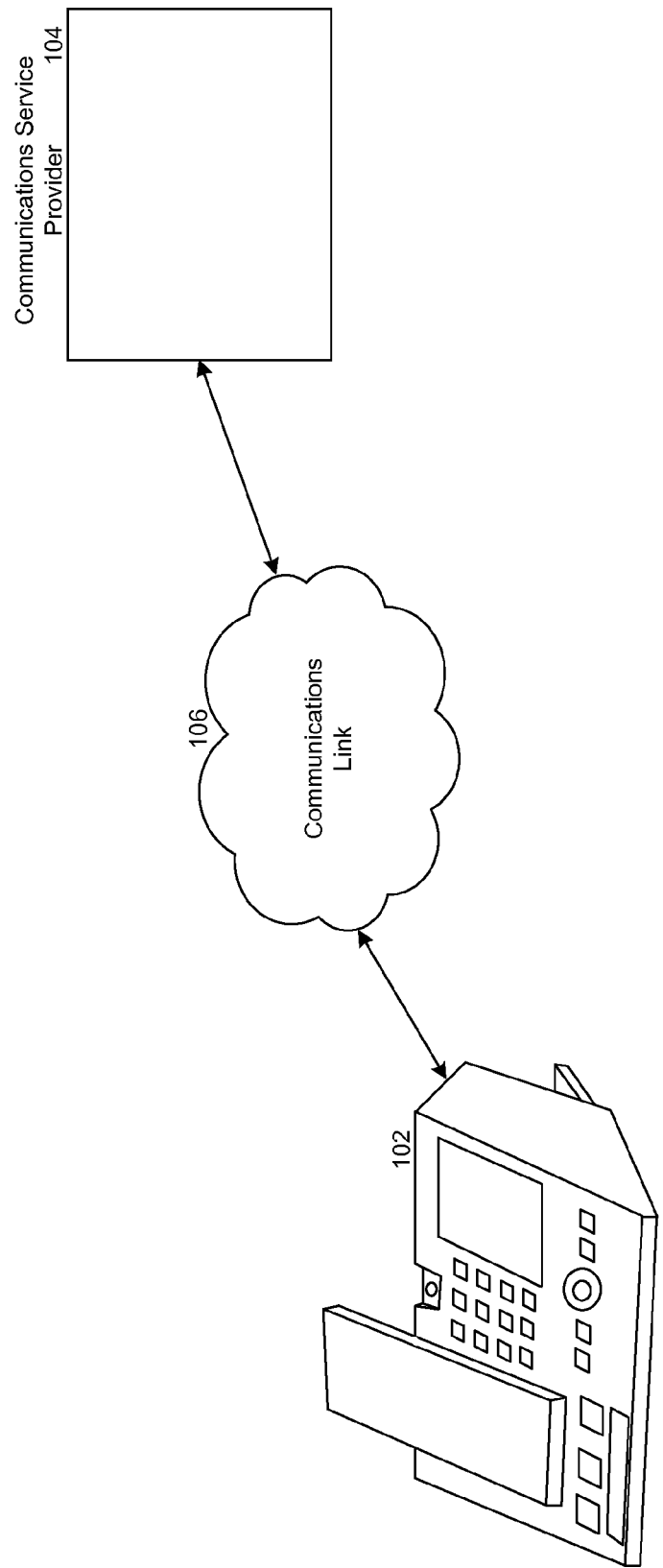
FIG. 1 is a high-level block diagram that illustrates an environment in which a communications device executes, according to some embodiments.

A method and system for providing multiple user authentications on a communications device is provided. A communications device provides a biometric reader to authenticate users onto the communications device based on a single biometric input. The communications device maintains a local copy of the strong authentication credentials, such as a user identification and password, and the biometrics which were previously input by users of the communications device. Then, rather than requiring re-entry of the strong authentication credentials to authenticate (or re-authenticate) these users onto the communications device, the communications device is able to authenticate the users based on the input of the appropriate biometric. When a biometric input is received, the communications device identifies the locally stored strong authentication credentials that is associated with the input biometric, and uses the locally stored strong authentication credentials to authenticate the user. In this manner, the communications device allows easy authentication (re-authentication) of multiple users who have already entered their strong user credentials.

For example, when a user inputs his or her strong authentication credentials to log on and use the communications device, the communications device checks to determine whether the user's biometric is locally stored, for example, in volatile memory, on the communications device. If the user's biometric is locally stored, then the communications device proceeds to authenticate the user. For example, the communications device uses the input strong authentication credentials to log the user onto a coupled communications service provider. Otherwise, if the user's biometric is not locally stored on the communications device (i.e., the communications device does not have a locally stored copy of a biometric associated with the input strong authentication credentials), then the communications device requests that the user input a biometric using the provided biometric reader. Upon receiving the user's biometric, the communications device associates the received biometric to the user's strong authentication credentials, and locally stores the strong authentication credentials and the biometric. The communications device then proceeds to use the input strong authentication credentials to log the user onto a coupled communications service provider. Subsequently, when the same user, or another user, inputs his or her biometric using the provided biometric reader to log on and use the communications device, the communications device checks to determine whether there is a local copy of the strong authentication credentials associated with the input biometric. Stated another way, the communications device checks its local store for the existence of the input biometric and an associated strong authentication credentials. If the communications device determines that strong authentication credentials associated with the input biometric are already stored on the communications device, the communications device proceeds to authenticate the user by using the locally stored strong authentication credentials to log the user onto a coupled communications service provider. Otherwise, if the strong authentication credentials associated with the input biometric is not locally stored on the communications device (i.e., the communications device does not have a locally stored copy of the strong authentication credentials associated with the input biometric), then the communications device provides an error message to the user, for example, using a coupled display device. In some embodiments, if the strong authentication credentials associated with the input biometric is not locally stored on the communications device, then the communications device can request that the user input the strong authentication credentials. Upon receiving the strong authentication credentials, the communications device associates the received strong authentication credentials with the user's biometric, and locally stores the strong authentication credentials and the biometric. The communications device can then proceed to use the input strong authentication credentials to log the user onto a coupled communications service provider.

In some embodiments, the communications device may encrypt the strong authentication credentials and/or the biometric, and locally store the encrypted strong authentication credentials and the biometric. In some embodiments, the communications device may also store the strong authentication credentials and the associated biometrics on non-volatile memory on the communications device. In some embodiments, the communications device may maintain a predetermined maximum number of locally stored strong authentication credentials and their associated biometrics. The communications device may employ any of a variety of well-known aging techniques to not exceed the predetermined maximum number of locally stored strong authentication credentials and their associated biometrics.

FIG. 1 is a high-level block diagram that illustrates an environment in which a communications device executes, according to some embodiments. The communications device is implemented as an IP telephone 102 that is coupled to a communications service provider 104 via a communications link 106. The communications service provider provides communications services, such as, by way of example, VoIP, instant messaging, presence information, etc. The IP telephone allows users to log on to and use the services provided by the communications service provider. In general terms, the communications link facilitates the transfer of electronic content between, for example, the attached IP telephone and components of the communications service provider. In some embodiments, the communications link includes the Internet. It will be appreciated that the communications link may be comprised of one or more other types of networks, such as a local area network, a wide area network, a point-to-point dial-up connection, and the like.

Figure 2:
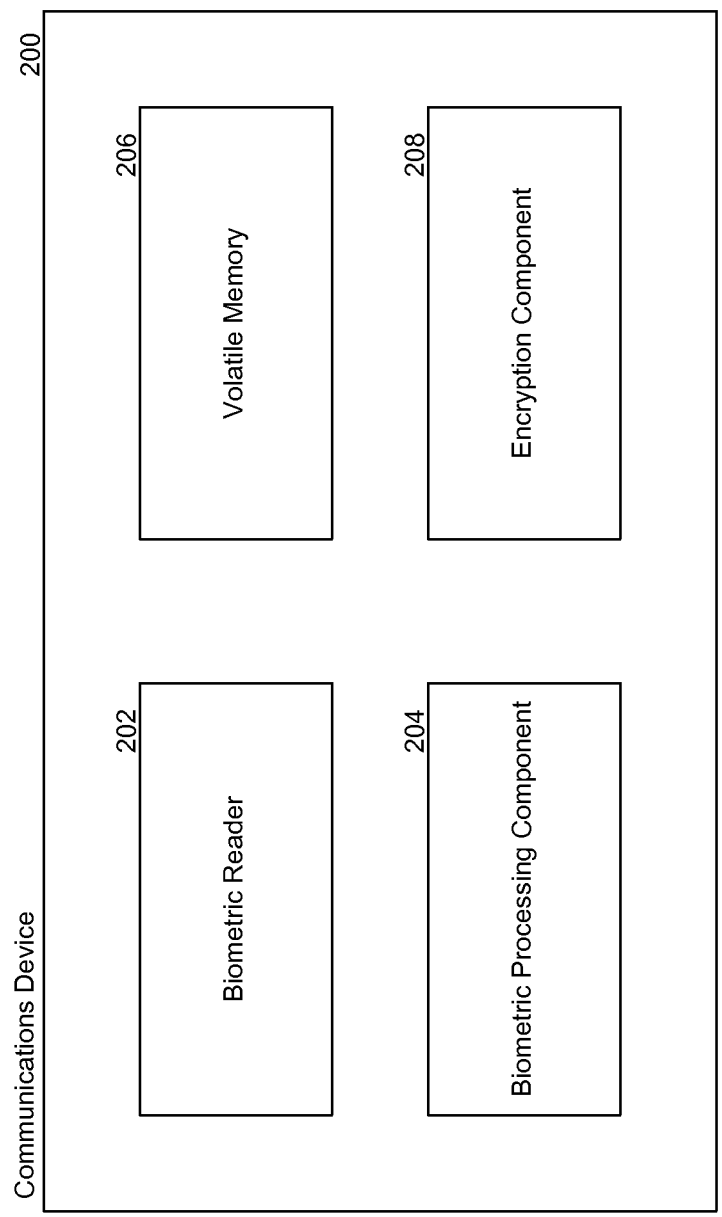
FIG. 2 is a block diagram that illustrates selected components of the communications device, according to some embodiments.

FIG. 2 is a block diagram that illustrates selected components of the communications device, according to some embodiments. As depicted, a communications device 200 comprises a biometric reader 202, a biometric processing component 204, a volatile memory 206, and an encryption component 208. The biometric reader controls the receipt of a user's physical characteristic, such as, by way of example, a fingerprint, an eye retina, facial pattern, etc., and generates a digital representation, such as a template, of the obtained biometric. For example, a fingerprint reader operates to obtain a scan of a fingerprint and generates a digital representation of the fingerprint. Similarly, a retina reader obtains and generates a digital representation of a provided retina. The biometric processing component controls the processing of the biometrics. For example, the biometric processing component is invoked to determine whether there is a local copy of strong authentication credentials associated with an input biometric, or whether there is a local copy of a biometric template that is associated with an input strong authentication credentials. The biometric processing component is also invoked to associate the biometric templates with their corresponding strong authentication credentials, and to store the strong authentication credentials and the associated biometric templates on the volatile memory. The volatile memory (i.e., storage device whose contents are lost when its power is off), such as, by way of example, random access memory (RAM), contains the strong authentication credentials and the biometric templates. In some embodiments, the communications device may maintain the strong authentication credentials and the biometric templates in non-volatile memory (i.e., storage device whose contents are preserved when its power is off). The encryption component is invoked to encrypt the strong authentication credentials and/or the biometric templates. Although not shown in FIG. 2, the communications device includes components that allow users to use the communications device for its intended purpose as well as to receive and locally store biometrics. For example, the communications device may also include components that allow its user to make and receive VoIP calls, send and receive SMS messages, receive and view presence information, and the like. The aforementioned components of the communications device are only illustrative and are not intended to suggest any limitation as to the implementation of the illustrated components and/or the scope of use or functionality of the communications device. For example, in some embodiments, the biometric processing component functionality may be provided by another component, such as the communications device's processor (not shown).

Computing devices on which the communications device may be implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the communications device. As used herein, "computer-readable media encoded with computer executable instructions" means computer-readable media comprising computer executable instructions. In addition, the data structures and message structures may be stored or transmitted via a data transmission medium, such as a signal on the communications link. Various communication links may be used, such as the Internet, a local area network, a wide area network, a point-to-point dial-up connection, a cell phone network, and so on.

Embodiments of the communications device may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The communications device may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
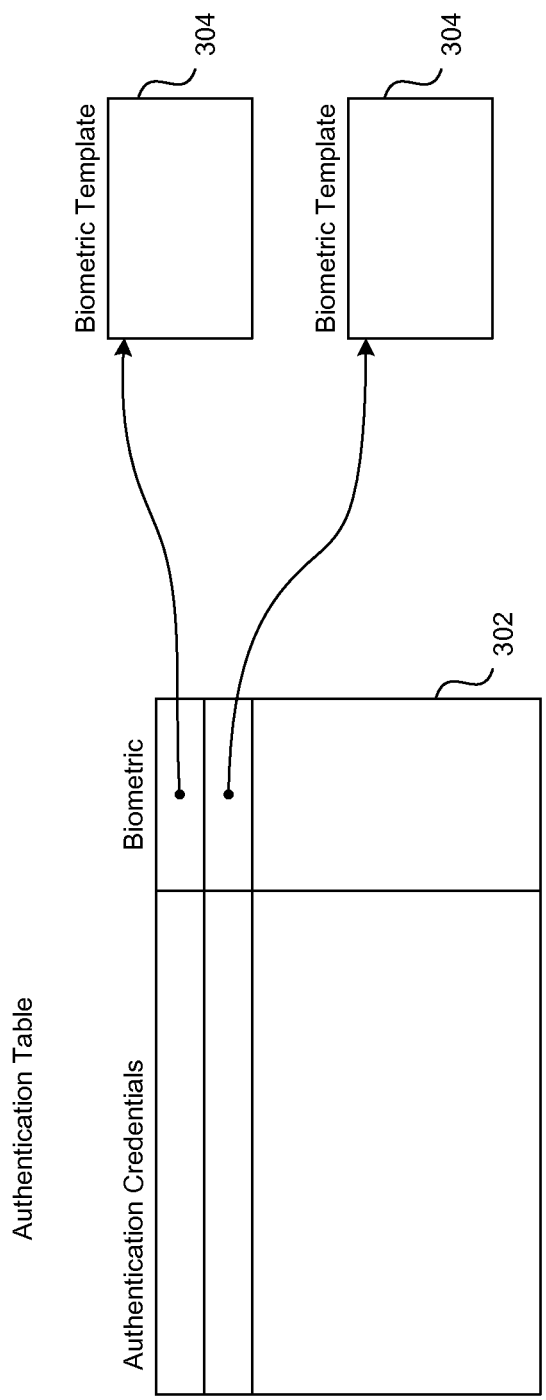
FIG. 3 is a data structure diagram that illustrates example logical data structures of the communications device, according to some embodiments.

FIG. 3 is a data structure diagram that illustrates example logical data structures of the communications device, according to some embodiments. The data structure may be implemented on the volatile memory of the communications device. The data structure may comprise an authentication table 302 that maintains an association between each authentication credentials and its corresponding biometric. The authentication table includes an entry for each authentication credentials that has been entered into the communications device. The authentication credentials may be a user's strong authentication credentials or other data that is used to verify the identity of the user. Each entry in the authentication table points to a biometric template 304, which is a digital representation of the biometric characteristic that is provided by the user identified in the corresponding entry in the authentication table. One skilled in the art will appreciate that this is only one example of the logical layout of the data structures of the communications device. The data structures of the communications device may be tailored to the space/computation requirements of the communications device.

Figure 4:
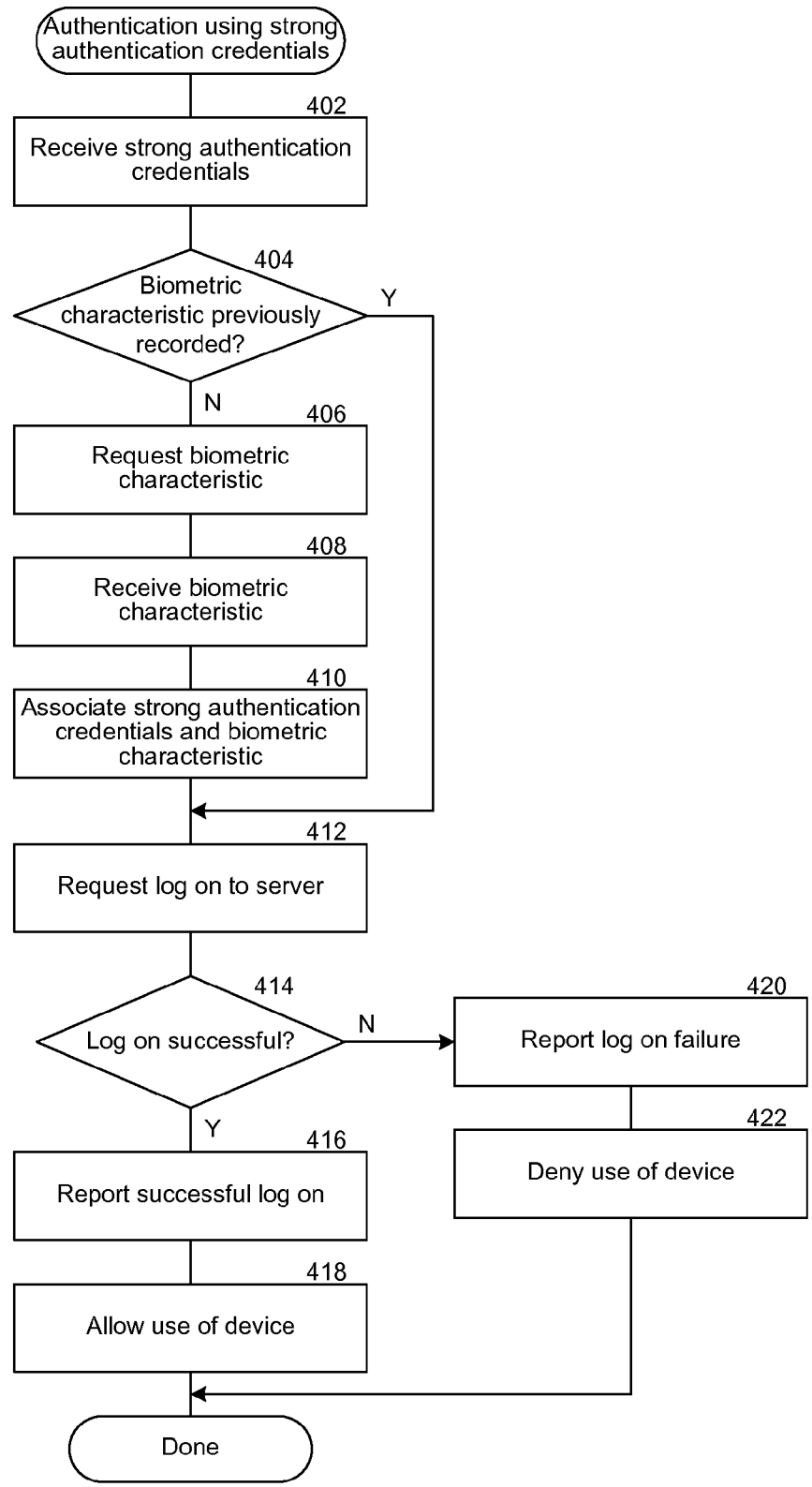
FIG. 4 is a flow diagram that illustrates the processing of the communications device to authenticate a user using strong authentication credentials, according to some embodiments.

FIG. 4 is a flow diagram that illustrates the processing of the communications device to authenticate a user using strong authentication credentials, according to some embodiments. By way of example, the communications device may be coupled to a communications server, and a user may enter his or her strong authentication credentials using, for example, a keypad or a touch screen provided by the communications device to log on to the communications server and use the communications device. In block 402, the communications device receives the input strong authentication credentials. In decision block 404, if a biometric characteristic has already been recorded for the received strong authentication credentials, then the communications device continues at block 406, else the communications device continues at block 412. In block 406, the communications device requests that a biometric characteristic be provided by the user. For example, if the communications device provides a fingerprint reader, the communications device can display on a coupled display device a request for the user to input the biometric by placing the user's index finger on the fingerprint reader. In block 408, assuming that the user provides the requested biometric characteristic, the communications device receives the provided biometric characteristic. The communications device then creates a digital representation of the biometric characteristic (e.g., a biometric template). In block 410, the communications device associates the received strong authentication credentials with the biometric template. For example, the communications device creates an entry in the authentication table for the received strong authentication credentials and its associated biometric template. In block 412, the communications device requests to log on to the coupled communications server using the received strong authentication credentials. In decision block 414, if the log on request is successful, then the communications device continues at block 416, else the communications device continues at block 420. In block 416, the communications device reports the successful log on to the communications server. For example, the communications device may provide an indication, such as a message, on the communication device that informs the user of the successful log on to the communications server. In block 418, the communications device allows use of its provided features by, for example, the user, and completes. In block 420, the communications device reports the unsuccessful attempt to log on to the communications server. For example, the communications device may provide an indication, such as a message, on the communication device that informs the user of the failed log on attempt to the communications server. In block 422, the communications device denies use of its features, and completes. In this instance, the user is not provided use of the features provided by the communications device because of the failed log on to the communications server.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 5:
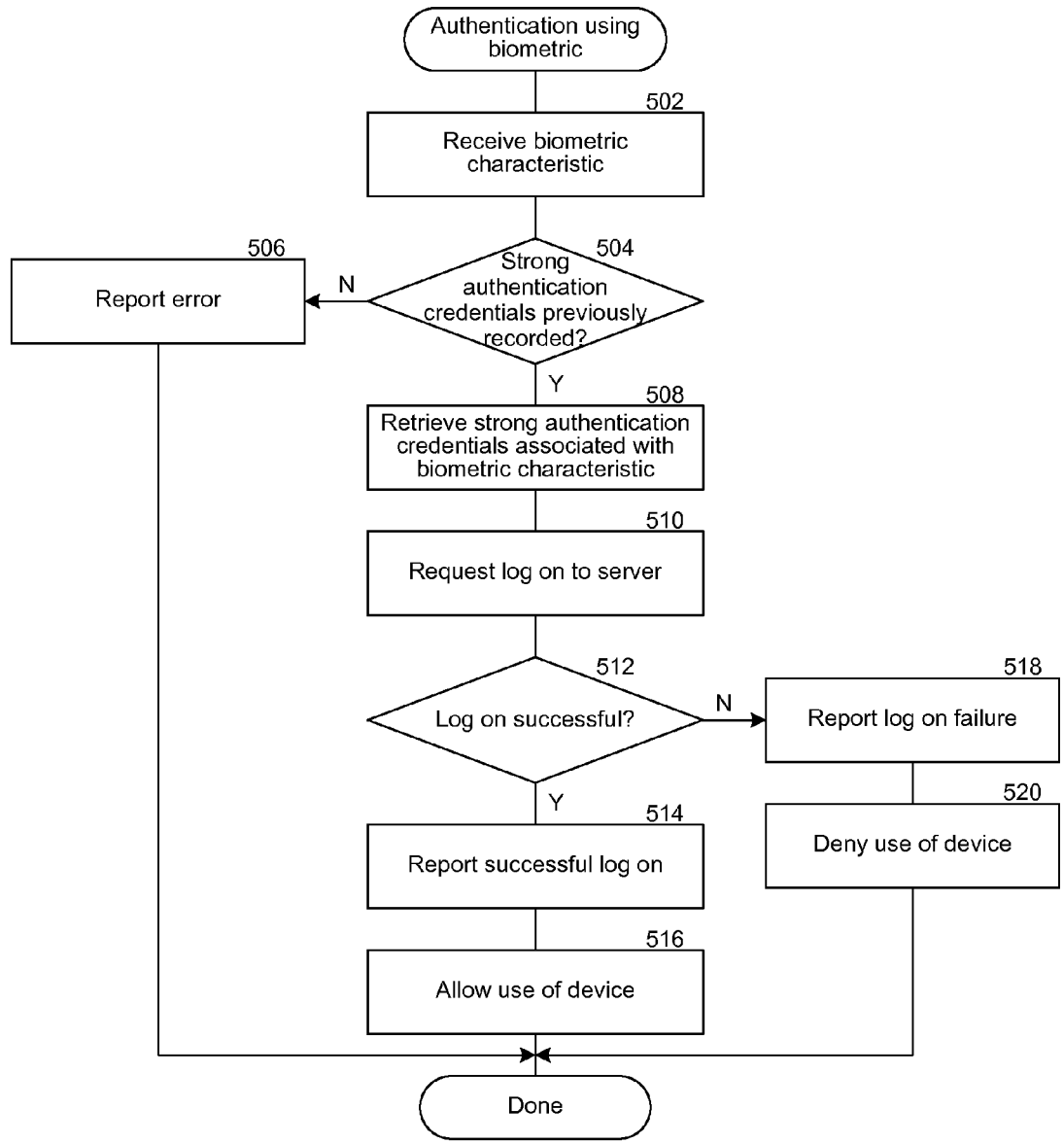
FIG. 5 is a flow diagram that illustrates the processing of the communications device to authenticate a user using biometrics, according to some embodiments.

FIG. 5 is a flow diagram that illustrates the processing of the communications device to authenticate a user using biometrics, according to some embodiments. By way of example, the communications device may be coupled to a communications server, and a user may enter his or her biometric characteristic on the biometric reader provided by the communications device to log on to the communications server and use the communications device. In block 502, the communications device receives the input biometric characteristic. The communications device then creates a digital representation (e.g., a biometric template) of the biometric characteristic. In decision block 504, if a strong authentication credentials has already been recorded for the input biometric characteristic, then the communications device continues at block 506, else the communications device continues at block 508. Stated another way, the communications device checks to determine if there is a local copy (e.g., a record) of the biometric template and an associated strong authentication credentials, for example, in the authentication table. In block 506, the communications device, not having found a local copy of the strong authentication credentials associated with the input biometric characteristic, reports the error condition, and completes. For example, the communications device may provide an indication, such as a message, on the communication device that informs the user that there is no strong authentication credentials associated with the input biometric characteristic. In block 508, the communications device retrieves the strong authentication credentials associated with the input biometric characteristic. For example, the communications device can match the biometric template created from the input biometric characteristic to the local copies of the biometric templates and, upon determining a match, retrieve from the authentication table the strong authentication credentials that correspond to the matched biometric template. In block 510, the communications device requests to log on to the coupled communications server using the retrieved strong authentication credentials. In decision block 512, if the log on request is successful, then the communications device continues at block 514, else the communications device continues at block 518. In block 514, the communications device reports the successful log on to the communications server. In block 516, the communications device allows use of its provided features by, for example, the user, and completes. In block 518, the communications device reports the unsuccessful attempt to log on to the communications server. In block 520, the communications device denies use of its features, and completes. In this instance, the user is not provided use of the features provided by the communications device because of the failed log on to the communications server. In this manner, the communications device is able to quickly authenticate users using only an input biometric for users who have previously provided their strong authentication credentials and biometric characteristics on the communications device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the communications device has been described as authenticating a user by logging the user onto a coupled communications server, the communications device need not log the user onto a communications server. For example, the communications device may use the locally stored strong authentication credentials of a user to locally authenticate the user to use the features of the communications device. Accordingly, the invention is not limited except as by the appended claims.

I claim:

1. A computer-implemented method for authenticating a first user of a communications device having a biometric reader, the method comprising:
   receiving from the first user authentication credentials for authenticating the first user to a service, the service storing a copy of the authentication credentials;
   storing on the communications device the authentication credentials;
   receiving via the biometric reader of the communications device a first instance of a biometric characteristic from the first user;
   storing on the communications device the first instance of the biometric characteristic in association with the stored authentication credentials;
   after storing the first instance of the biometric characteristic and the authentication credentials,
      receiving via the biometric reader a second instance of the biometric characteristic of a user;
      determining whether the second instance of the biometric characteristic matches the first instance of the biometric characteristic; and
      in response to determining that the second instance of the biometric characteristic matches the first instance of the biometric characteristic,
         retrieving the authentication credentials that is stored in association with the first instance of the biometric characteristic; and
         providing to the service the retrieved authentication credentials so that the service can authenticate the first user based on the stored copy of the authentication credentials.

2. The method of claim 1 wherein the biometric characteristic is a fingerprint scan.

3. The method of claim 1 wherein the biometric characteristic is a retina scan.

4. The method of claim 1 including authenticating the user by:
   requesting log on to a server using the authentication credentials;
   upon successfully logging on, allowing use of the communications device; and
   upon unsuccessfully logging on, denying use of the communications device.

5. The method of claim 1 further comprising upon receiving a third instance of the biometric characteristic that matches the first instance of the biometric characteristic, authenticating the user using the authentication credentials.

6. A device for authenticating a user of the device, the device comprising:
   a biometric reader;
   one or more memories storing computer-executable instructions that control the device to:
      receive authentication credentials for a first user, the authentication credentials not being a biometric characteristic;
      receive via the biometric reader a first biometric characteristic for the first user;
      associate the first biometric characteristic with the authentication credentials; and
      after the first biometric characteristic is associated with the authentication credentials,
         receive via the biometric reader a second biometric characteristic for a user;
         determine whether the second biometric characteristic matches the first biometric characteristic;

in response to determining that the second biometric characteristic matches the first biometric characteristic, provide the authentication credentials to authenticate the first user; and a processor for executing the computer-executable instructions stored in the one or more memories.

7. The device of claim 6 wherein the first biometric characteristic and the second biometric characteristic are fingerprint scans.

8. The device of claim 6 wherein the first biometric characteristic and the second biometric characteristic are retina scans.

9. The device of claim 6 wherein the instructions that provide further provide the authentication credentials to a server so that the server can authenticate the first user.

10. The device of claim 6 wherein the instructions that provide further provide the authentication credentials to an application so that the application can authenticate the first user.

11. The device of claim 6 wherein the instructions further comprise instructions that encrypt the authentication credentials.

12. The device of claim 6 wherein the instructions further comprise instructions that receive additional authentication credentials of the first user and encrypt a list of the authentication credentials and the additional authentication credentials.

13. The device of claim 12 wherein the instructions further comprise instructions that associate the first biometric characteristic with the additional authentication credentials.

14. The device of claim 6 wherein the instructions that provide further provide the authentication credentials for locally authenticating the first user to use a feature of the device.

15. One or more computer memories that store computer-executable instructions that control a communications device provide authentication credentials for authenticating a user of the communications device, the device having a biometric reader, the instructions comprising instructions control the communications device to:

receive authentication credentials from a first user;
receive via the biometric reader a first biometric characteristic from the first user;
encrypt the authentication credentials;
create a first representation of the first biometric characteristic;
store the encrypted authentication credentials and the first representation of the first biometric characteristic locally in non-volatile memory of the communications device; and
after the first representation of the first biometric characteristic and the authentication credentials are stored,
receive via the biometric reader a second biometric characteristic of a user;
create a second representation of the second biometric characteristic;
determine whether the second representation matches the first representation; and
in response to determining that the second representation matches the first representation,
retrieve the encrypted authentication credentials stored locally in non-volatile memory;
decrypt the encrypted authentication credentials for use in authenticating the first user; and
provide the decrypted authentication credentials for authenticating the first user.

16. The one or more computer memories of claim 15 wherein the first biometric characteristic and the second biometric characteristic are fingerprint scans.

17. The one or more computer memories of claim 15 wherein the first biometric characteristic and the second biometric characteristic are retina scans.

18. The one or more computer memories of claim 15 wherein the instructions that provide further comprise instructions to send the authentication credentials to a server so that the first user can be logged on to the server.

19. The one or more computer memories of claim 15 wherein instructions that provide further comprise instructions to provide the authentication credentials to an application so that the first user can use the application.

20. The one or more computer memories of claim 15 wherein the instructions further comprise instructions to receive additional authentication credentials of the first user and encrypt a list of the authentication credentials and the additional authentication credentials.

21. The one or more computer memories of claim 15 wherein the instructions further comprise instructions that associate the first biometric characteristic with the encrypted list.

22. The one or more computer memories of claim 15 wherein the authentication credentials are provided for locally authenticating the first user to use a feature of the communications device.

* * * * *